Sept. 3, 1935.  L. T. TROLAND  2,013,116
PHOTOGRAPHIC MATRIX
Filed Oct. 21, 1930
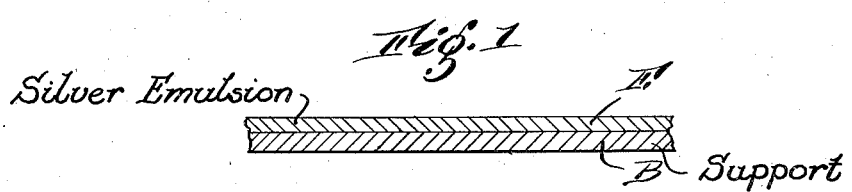
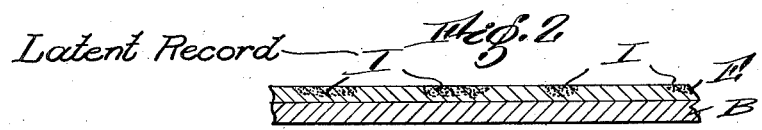
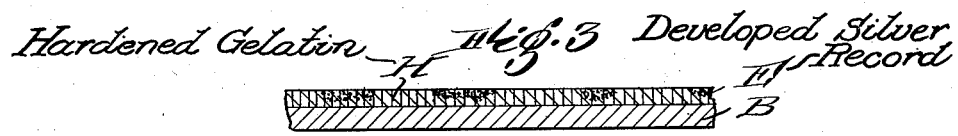

Patented Sept. 3, 1935

2,013,116

UNITED STATES PATENT OFFICE 2,013,116

PHOTOGRAPHIC MATRIX

Leonard T. Troland, Cambridge, Mass., assignor, by mesne assignments, to Technicolor, Inc., New York, N. Y., a corporation of Delaware Application October 21, 1930, Serial No. 490,184

16 Claims. (Cl. 95—5.4)

The present invention relates to a photographic process of making photographic prints, especially for use in the art of cinematography in natural colors, and to the films and matrices used in this process and resulting therefrom.

Various methods of making prints are known whereby dyes are used to stain a photographically produced gelatin record, that is a gelatin layer which has varying properties relative to the ability of taking up dyes, thereby forming a record whether or not actually stained. Such gelatin records are also used for transferring dye to gelatin coated material according to the so-called imbibition method. The so-called "pina-type", "hydro-type" and allied processes utilize differentially hardened colloids, whereby the more exposed parts of an emulsion are hardened to a greater extent than the less exposed parts. The differentially hardened gelatin correspondingly takes up, by absorption, adsorption or some other chemical or physical process, different amounts of dye, no part of the original gelatin being removed.

Matrices made according to these methods are in certain respects superior to relief matrices, especially because the dye transfer from the lower parts of a relief is not as perfect as from the higher parts, which come into much better contact with the transfer blank. This causes certain irregularities as for instance so-called dye pools, which can be avoided by using a substantially flat matrix. Another disadvantage of relief matrices is the necessity of printing them through the support which requires the use of projection printing machines which are in many respects less desirable than contact printers. However, the flat matrices heretofore proposed have also certain disadvantages. They are not as durable as might be desired and moreover require the making of master positives from the original negatives since the dark parts of the final picture correspond to soft parts of the gelatin and therefore to dark parts of the record from which the differentially hardened gelatin picture is made.

It is the main object of the present invention to produce a record made up of gelatin of varying hardness directly from a photographic negative. Another object is to make such gelatin records which are extremely durable, and which may be used either directly by staining up or as matrices for dye transfer. Still another object is to make such gelatin records which reproduce every detail sharply and well defined and which have practically clear high lights. A further object is a process of making films for cinematography in natural colors which requires a minimum of material and labor and which utilizes practically indestructible matrices. Other objects will be apparent from the following description which refers to a drawing showing four sections through a film in various stages of the process to be described.

In order to obtain these objects I produce a gelatin record which is relatively soft, in accordance with the gradations of the picture, where it has been exposed to light and which is extremely hard in the non-exposed parts. It has heretofore been proposed to soften the exposed parts of a silver emulsion, as for instance with ferric chloride. These processes, however, are not satisfactory in actual practice, probably because the softening is not preceded by a proper treatment of the whole emulsion. In accordance with the present invention the entire silver emulsion layer is superhardened either prior to, or after exposure, i. e. it is hardened to a much higher degree than that of ordinary emulsions, and the parts affected in varying degrees by the light are softened in a manner peculiarly adapted for this purpose, after the silver record is developed. The invention will be better understood from the following description of the general idea as well as of several concrete embodiments illustrating the genus of the invention.

Referring now to the drawing, Fig. 1 depicts an ordinary film with a base or support S and a silver gelatin emulsion E. Fig. 2 shows the same film after exposure, the parts I of the emulsion having been acted upon by the light under a photographic negative. Either prior to exposure or after exposure and development the entire film is hardened, as shown in Fig. 3, where H represents the hardened emulsion, including the parts which have been exposed to light. Fig. 4 shows the finished film after softening the emulsion at the image areas as described more fully below. There are various means for hardening the emulsion, and I prefer for this purpose either chrome alum or bichromates which are subsequently treated with a suitable reducer, as for instance, sulfur dioxide gas. However, other hardening agents, as for instance formaldehyde, pyrogallol, pyrocatechol, or hydroquinone may be used for the same purpose. The hardening is to be continued until the film is so extremely hard that it becomes practically non-absorptive of dye. The parts of the emulsion which have been acted upon by the printing light are now softened by bathing the film in agents which render the previously extremely hard emulsion soft and capable of holding dye in proportion with the intensity or duration of the action of the light upon these parts. Although the specific details of the reactions and end products of gelatin with hardening agents are not known I assume that the hardening is due to the formation of an indefinite compound of gelatin and the hardening agent. This compound, though it may vary in chemical composition depending on the nature of the hardening agent, is most likely specifically susceptible to reversal of the reaction by treatment with oxidizing agents in the presence of finely divided silver. It is not assumed that the softening is the chemical equivalent of a reversal of the hardening reaction, but it is certain that the specific presence of silver localizes the softening to the areas which contain silver and that it is therefore controlled in degree as well as extent by the amount of silver present in the exposed and developed emulsion. Without the presence of silver, this reaction, or series of reactions, might of itself produce results chemically equivalent in their qualitative aspect, to those of the present invention, which however utilizes these results for its purposes by specifically controlling them with the silver record. I found that any of the following oxidizing agents act as softeners, namely: potassium ferricyanide together with potassium permanganate; ammonium persulfate; copper bromide with hydrogen peroxide; or copper sulfate combined with potassium bromide, nitric acid and sodium perborate. In Fig. 4 the softened parts are indicated at S. After the softening has proceeded to the desired extent, the film is cleared, washed, and dried. It is to be observed that the softening of the silver record parts by the above enumerated agents comprises a chemical change of these parts, resulting in bleaching them, so that the silver record does not interfere with a subsequently produced dye record. The remaining silver salts are preferably removed by any of the methods well known for this purpose. The film may now be bathed in a suitable dye which will stain the record parts in proportion to their softness, thereby directly producing a positive dye record since the softened parts which correspond to the more transparent parts of the negative from which the film was printed will take up more dye than the other parts whereas the non-exposed parts will remain in their extremely hard condition, thereby assuring clear high lights. The differentially softened film may also be used as a dye transfer matrix. For this purpose it is soaked in a suitable dye solution, the surplus dye washed off and the matrix then brought into contact with a colloid covered blank into which the dye transfers from the matrix in a manner well known in the art. The softer parts transfer more dye than the harder parts and the superhardened parts which are not at all affected by the softener will not transfer any dye, which again assures clear high lights. It will also be understood by anyone skilled in the art, that this matrix can be used for printing from it with greasy ink, in which case it would have to be exposed behind a positive. The printing process which involves the taking up of ink by the harder parts, and its repulsion by the moistened softer parts of the matrix, is well known in the art and requires no further description.

As mentioned above, the film may also be superhardened prior to exposure, with any of the agents used for hardening after exposure as described, and softened after development in the same manner as if hardened after exposure. Hardening of the film before exposure has the following advantages: The penetration of the record and the resulting density distribution will be essentially restricted to the exposed surface of the emulsion, because the superhardened gelatin will tend to retard penetration of chemical solutions and permit the employment of a developer of higher potential, thus ensuring a maximum closeness of packing of the silver per unit of optical density, the result being a reduction of graininess. The superhardened gelatin will also permit the use of higher temperatures during development and of agents in the developer which improve the nature of the silver grains and/or the developing speed but which would soften ordinary soft gelatin to a degree making the use of such agents, e. g. strong ammonia, strong caustic soda, etc., hazardous or impossible.

In order to enable any one skilled in the art to carry out the above described process three embodiments will now be specifically described by way of example.

*First example.*—A silver record is produced upon an ordinary silver bromide film by any known methods of exposure and development with non-hardening developers. The entire gelatin layer is then superhardened by bathing the film in concentrated basic chrome alum. The film is then immersed in a bath of approximately the following composition:

| | | |
|---|---|---|
| Water | 100 | c. c. |
| Copper sulfate | 2 | grams |
| Potassium bromide | 0.1 | gram |
| Nitric acid | 2 | c. c. |
| Sodium perborate | 5 | grams |

This bath bleaches and softens the silver record quite rapidly. The resulting silver salts are then removed by fixation in ordinary sodium thio-sulfate. After having been washed the film may then be stained, as for instance with Kodachrome red or Pinatype blue D, which may either be retained in the film or which may be transferred to a gelatin coated blank.

*Second example.*—The gelatin bearing the record in metallic silver is rendered very hard, for instance by bathing in chrome alum as above described. It is then softened and bleached in the following solution:

| | |
|---|---|
| Potassium ferricyanide | 1 gram |
| Potassium permanganate | 1 gram |
| Water | 100 c. c. |

This treatment softens the gelatin in correspondence with the density of the record. The film is then cleared by washing in dilute hydrochloric acid, subsequently immersed in an approximately 10% solution of sodium bisulfite in order to remove any remaining permanganate and is then fixed in ordinary fixing salt, washed and dried. The film may now be utilized as described above, either by staining it or by using it as a transfer matrix.

*Third example.*—An ordinary silver bromide film is bathed for approximately five seconds in a bath containing approximately 2 grams of chrome alum to 100 c. c. water, a slight amount of ammonia being added in order to neutralize to some extent the acidic character of the chrome alum solution. The film is then exposed, developed and softened according to any of the methods above described, and may also be utilized either by staining or by using it as a transfer matrix. As already pointed out, temperatures and developing agents can be used for the development of the prehardened emulsion, which could not be applied to ordinary gelatin emulsions.

A dyed gelatin picture, or a transfer matrix made according to the present invention is much more durable than an ordinary differentially hardened matrix, since its hardest parts are considerably harder than the hardest parts of an ordinary matrix. This is due to the prehardening process which also renders the softer parts correspondingly more durable. A further result of the prehardening treatment is an extremely correct and sharp reproduction of all the details and gradations of the negative, and the lack of any objectionable matrix pattern in addition to the unavoidable silver grain pattern.

It should be understood that the present disclosure is for the purpose of illustration only and that this invention includes all modifications and equivalents which fall within the scope of the appended claims.

I claim:

1. The method of photographically making substantially flat gelatin records which comprises uniformly hardening the whole record area of a photographic silver emulsion and subsequently softening the parts affected by light and developed to constitute a silver record, under control by said record.

2. The method of photographically making substantially flat gelatin records which comprises uniformly treating the whole record area of a photographic silver emulsion to a high degree of hardness and subsequently softening the parts affected by light in proportion with, and under control of the density of the developed silver record.

3. The method of making substantially flat matrices for dye printing which comprises making the entire record area of a photographic silver haloid emulsion substantially impervious to dyes by hardening it, exposing and developing the emulsion and softening the developed record in accordance with the action of the light, the parts most affected by the light and constituting a silver record being softened to a greater extent than the less affected parts under control of said record.

4. The method of making substantially flat dyed gelatin records which comprises treating a prehardened, substantially dye impervious gelatin layer containing a silver record in an agent containing ferricyanide and potassium permanganate, and subsequently dyeing said layer.

5. The method of making substantially flat gelatin records which comprises rendering a gelatin layer containing a positive silver record substantially impermeable to dye by means of a hardener and subsequently differentially softening the gelatin under control of the silver record.

6. The method of making substantially flat gelatin records which comprises rendering a gelatin layer containing a silver record substantially impermeable to dye by means of a hardener containing chromium compounds and subsequently differentially softening the gelatin under control of the silver image.

7. The method of making substantially flat gelatin records which comprises rendering a gelatin layer containing a silver record substantially impermeable to dye by means of a hardener containing chromium compounds and subsequently differentially softening the gelatin under control of the silver record in a bath containing an oxidizing agent.

8. The method of making substantially flat gelatin records which comprises rendering a gelatin layer containing a silver record substantially impermeable to dye by means of a hardener containing chromium compounds and subsequently differentially softening the gelatin under control of the silver record in a bath containing hydrogen peroxide.

9. The method of photographically making substantially flat dye records which comprises rendering a gelatin layer containing a silver record substantially impermeable to dye by hardening it and differentially softening the gelatin, the softening action being controlled as to degree and location by said silver record.

10. The method of making substantially flat dyed gelatin records which comprises making a gelatin layer containing a silver record substantially dye impervious by means of a hardening bath containing chromium compounds, differentially softening said layer under control of the silver record in a softening agent containing ferricyanide and potassium permanganate, and subsequently dyeing the layer with a dye which is differentially absorbed by gelatin.

11. The method of making substantially flat photographic gelatin records which comprises the steps of superhardening, exposing and developing a silver emulsion, and then softening the exposed portions thereof under control of the silver record.

12. The method of making substantially flat photographic gelatin records which comprises the steps of superhardening, exposing and developing a silver emulsion, and then softening and bleaching the exposed portions thereof under control of the silver record.

13. The method of making substantially flat photographic gelatin records which comprises the steps of rendering a silver emulsion substantially impervious to dye and exposing it, then developing the latent image, treating it in an agent which differentially softens the gelatin under control of the silver record, and subsequently dyeing said emulsion.

14. The method of making substantially flat photographic gelatin records which comprises the steps of rendering a silver emulsion substantially impervious to dye and exposing it, then developing the latent image, treating it in an agent containing an oxidizer which differentially softens the gelatin under control of the silver record, and subsequently dyeing said emulsion.

15. The method of making substantially flat photographic records which comprises the steps of rendering a silver emulsion extremely hard, exposing and developing it, and then treating said emulsion with an agent adapted to resoften the gelatin, the resoftening action being controlled as to degree and location by the silver record contained in said emulsion.

16. The method of making substantially flat photographic gelatin records which comprises treating a prehardened, substantially dye-impervious gelatin layer containing a silver image in an agent containing copper sulfate and potassium perborate.

LEONARD T. TROLAND.